(12) United States Patent
Hong et al.

(10) Patent No.: US 12,118,429 B2
(45) Date of Patent: Oct. 15, 2024

(54) SERVICE PROVIDING METHOD BASED ON DIGITAL CARD CONNECTED TO DIGITAL CODE AND APPARATUS FOR PERFORMING THE METHOD

(71) Applicant: KAKAO CORP., Jeju-si (KR)

(72) Inventors: Na Yeong Hong, Seongnam-si (KR); Hun Jae Lee, Seongnam-si (KR); Sang Chul Lee, Seongnam-si (KR); Hae Won Sim, Seongnam-si (KR); Min Ji Jo, Seongnam-si (KR); Seung Hyun Ko, Seongnam-si (KR)

(73) Assignee: KAKAO CORP., Jeju-si (KR)

( * ) Notice: Subject to any disclaimer, the term of this patent is extended or adjusted under 35 U.S.C. 154(b) by 0 days.

(21) Appl. No.: 18/134,570

(22) Filed: Apr. 14, 2023

(65) Prior Publication Data

US 2023/0334276 A1  Oct. 19, 2023

(30) Foreign Application Priority Data

Apr. 14, 2022  (KR) ........................ 10-2022-0046432

(51) Int. Cl.
*G06K 7/14* (2006.01)
*G06K 19/06* (2006.01)
(52) U.S. Cl.
CPC ..... *G06K 7/1417* (2013.01); *G06K 19/06037* (2013.01)

(58) Field of Classification Search
CPC ............. G06K 7/1417; G06K 7/10722; G06K 7/10821; G06K 19/06037
USPC ....... 235/462.1, 462.09, 462.07, 462.01, 375
See application file for complete search history.

(56) References Cited

U.S. PATENT DOCUMENTS

| 2012/0233073 | A1* | 9/2012 | Salmon | G06Q 20/384 |
| | | | | 705/44 |
| 2013/0346302 | A1* | 12/2013 | Purves | G06Q 20/102 |
| | | | | 705/40 |
| 2014/0117087 | A1* | 5/2014 | Aldaag | G06Q 30/02 |
| | | | | 235/494 |
| 2015/0060540 | A1* | 3/2015 | Chen | G06Q 20/3552 |
| | | | | 235/379 |
| 2020/0349520 | A1* | 11/2020 | Mughal | H04L 63/0823 |

* cited by examiner

*Primary Examiner* — Edwyn Labaze
(74) *Attorney, Agent, or Firm* — Seed IP Law Group LLP

(57) ABSTRACT

A method and apparatus for providing a service based on a digital card connected to a digital code are provided. A service providing server is configured to generate a digital code connected to a service account of a partner terminal by connecting a plurality of digital codes selected by the partner terminal to a digital code and a user terminal is configured to use a digital card associated with the a user account among the plurality of digital cards connected to the digital code by scanning the digital code displayed on an online area and an offline area.

19 Claims, 6 Drawing Sheets

FIG. 5

Partner account

[Generate digital code]

- Digital code name — Enter the name of digital code
- Digital card to connect — Select a digital card to connect to digital code
- Add a digital card
- Expiry date of digital code — YY.MM.DD
- Cancellation of scan — ○ No  ○ Yes
-                   ○ Available  ○ Not available
- Scan completion message — Enter the text of scan completion message
- Duplicated scan message — Duplicated scan message

[Cancel]   [Register]

SERVICE PROVIDING METHOD BASED ON DIGITAL CARD CONNECTED TO DIGITAL CODE AND APPARATUS FOR PERFORMING THE METHOD

CROSS-REFERENCE TO RELATED APPLICATIONS

This application claims the benefit under 35 USC § 119(a) of Korean Patent Application No. 10-2022-0046432, filed on Apr. 14, 2022, in the Korean Intellectual Property Office, the entire disclosure of which is incorporated herein by reference for all purposes.

BACKGROUND

1. Field

The following description relates to a method and apparatus for providing a service providing based on a digital card connected to a digital code.

2. Description of Related Art

The use of various types of digital content has increased as the use of a device, such as a smartphone, has increased. More particularly, since a variety of information may be installed in a device, a user may prefer a digitized card to be stored in the device to a physical card that requires a separate space.

Accordingly, as the use of a digital card has increased, there is a demand for an application to improve user convenience.

SUMMARY

The present disclosure provides a method and apparatus for providing a service based on a digital card connected to a digital code.

The present disclosure allows to verify authorization or predetermined qualification to access an online area or an offline area determined by a partner terminal by providing, to a user terminal, a digital card registered to a user account among a plurality of digital cards connected to a digital code.

According to one embodiment, a method, performed by a service providing server, of providing a service based on a digital card, includes providing an interface for inputting information to generate a digital code through a digital code management page to a partner terminal, receiving a request to generate the digital code including information on the digital code, wherein the information is input by the partner terminal through the interface, generating the digital code associated with a service account of the partner terminal in response to the request to generate the digital code, and transmitting a result of generating the digital code to the partner terminal, wherein the digital code is connected to a plurality of digital cards selected by the partner terminal.

The digital code management page includes an interface for the partner terminal to set at least one of a name of the digital code, information on at least one digital card to be connected to the digital code, whether an expiry date of the digital code is set and the expiry date, whether scan of the digital code is cancelled, content of a message of completion of scan for the digital code, and content of a message of duplicated scan for the digital code.

The result of generating the digital code includes information on the digital code input by the partner terminal and an image of the digital code that is downloadable by the partner terminal.

The digital code management page includes an interface for the partner terminal to select the plurality of digital cards to connect to the digital code.

According to one embodiment, a method, performed by a service providing server, of providing a service based on a digital card, includes receiving a request for information on a digital card connected to a digital code scanned by the user terminal, wherein the user terminal is logged in to a service provided by the service providing server or an application provided by a separate application server linked with the service providing server, transmitting the information on a plurality of digital cards connected to the digital code, receiving, from the user terminal, a request to use a selected digital card among the plurality of digital cards connected to the digital code, and transmitting a result of using the selected digital card to the partner terminal in response to the use request.

The transmitting of the information on the plurality of digital cards connected to the digital code to the user terminal includes transmitting, to the user terminal, information on a digital card corresponding to a user account of the user terminal among the plurality of digital cards connected to the digital code.

The transmitting of the information on the plurality of digital cards connected to the digital code to the user terminal includes transmitting information on all of the plurality of digital cards connected to the digital code to the user terminal, and displaying, on the user terminal, information on a digital card corresponding to a user account of the user terminal among the plurality of digital cards connected to the digital code.

The digital card displayed on the user terminal includes a digital card that is not used by the user terminal and a digital card that is already used by the user terminal.

The digital card that is not used by the user terminal is activated to be selected by a user, and the digital card that is already used by the user terminal is deactivated to prevent the digital card from being selected by the user.

The digital card that is not used by the user terminal is displayed by being sorted based on a date of issuance, and the digital card that is already used by the user terminal is displayed by being sorted based on a date of use.

The digital card displayed on the user terminal includes a digital card that is not used by the user terminal except for a digital card that is already used by the user terminal.

When a digital card associated with a user account of the user terminal does not exist among the plurality of digital cards connected to the digital code or all digital cards associated with the user account of the user terminal are used among the plurality of digital cards connected to the digital code, displaying an invalid page on the user terminal.

The result of using the selected digital card includes at least one of a number of completed scans of the plurality of digital cards connected to the digital code, the user account of the user terminal, a name of the selected digital card, the time when the digital code is scanned, or the time when the selected digital card is used.

According to one embodiment, a method, performed by a user terminal, of providing a service based on a digital card, includes logging in to a service provided by a service providing server or an application provided by a separate application server linked with the service providing server, scanning a digital code displayed on an online area or an offline area, transmitting a request for information on a digital card connected to the digital code to the service providing server, receiving information on a plurality of digital cards connected to the digital code from the service providing server, displaying the digital card based on the received information on the plurality of digital cards, and transmitting a request to use the displayed digital card to the service providing server.

The received information on the plurality of digital cards from the service providing server includes information on a digital card corresponding to a user account of the user terminal among the plurality of digital cards connected to the digital code.

The received information on the plurality of digital cards from the service providing server includes information on all of the plurality of digital cards connected to the digital code, and the displaying of the digital card includes displaying a digital card corresponding to a user account of the user terminal among the plurality of digital cards connected to the digital code.

The digital code is generated in association with a service account of a partner terminal based on information of the digital code input by the partner terminal that logs in with a service account of the service providing server, and the digital code is scanned by a user terminal logged in with a user account to a service provided by the service providing server or an application provided by a separate application server linked with the service providing server.

The displaying of the digital card includes displaying a digital card that is not used by the user terminal and a digital card that is already used by the user terminal.

The digital card that is not used by the user terminal is activated to be selected by a user, and the digital card that is already used by the user terminal is deactivated to prevent the digital card from being selected by the user.

The displaying of the digital card includes displaying the digital card that is not used by the user terminal based on a date of issuance, and displaying the digital card that is already used by the user terminal based on a date of use.

The displaying of the digital card includes displaying a digital card associated with a user account of the user terminal among the plurality of digital cards connected to the digital code, and the displayed digital card includes a digital card that is not used by the user terminal except for a digital card that is already used by the user terminal.

BRIEF DESCRIPTION OF THE DRAWINGS

FIG. 5 is a diagram illustrating a digital code management page according to one embodiment.

Figure 1:
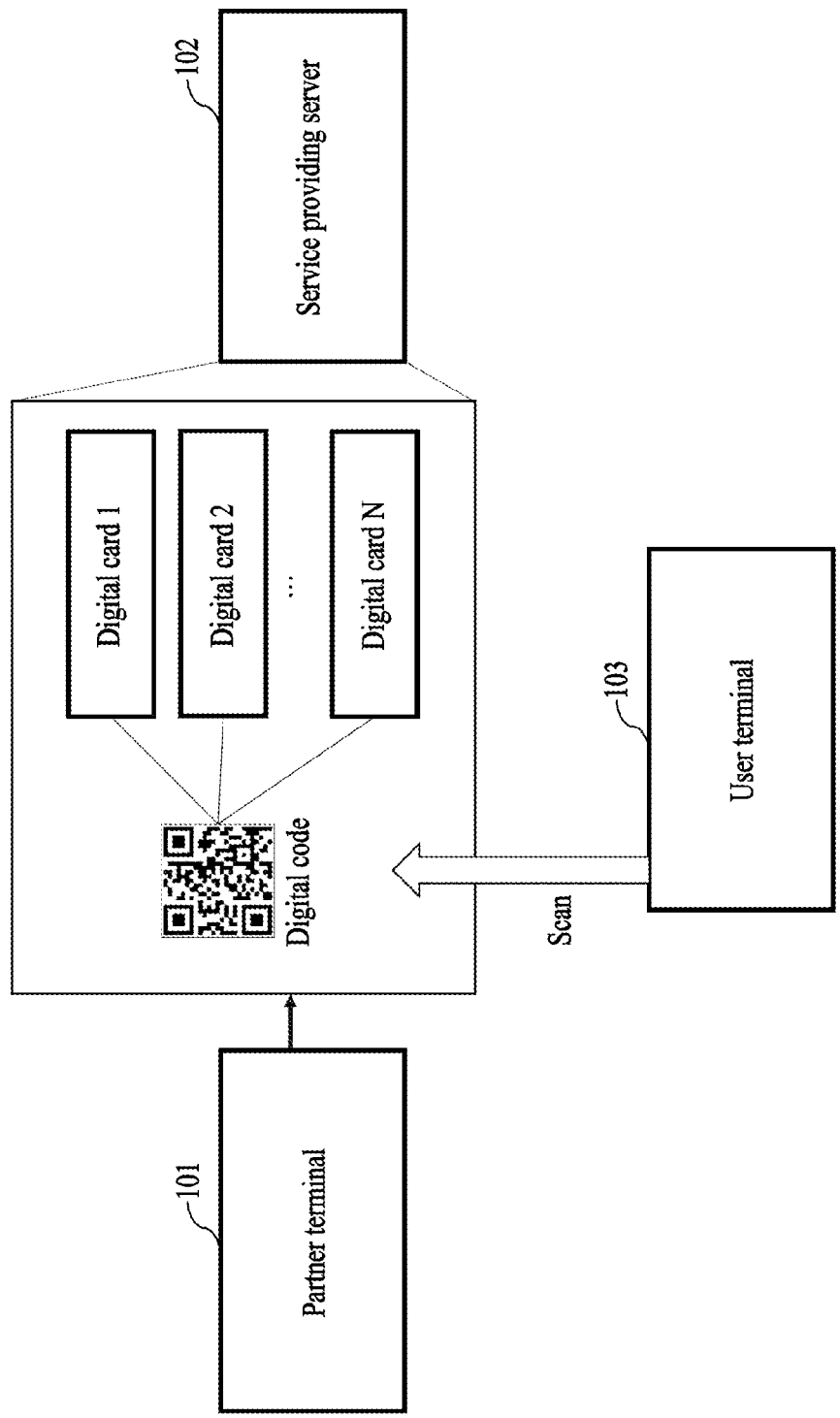
FIG. 1 is a diagram illustrating an apparatus for performing a service providing method based on a digital card, according to one embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Hereinafter, examples will be described in detail with reference to the accompanying drawings. The scope of the right, however, should not be construed as limited to the example embodiments set forth herein. In the drawings, like reference numerals are used for like elements.

Various modifications may be made to the examples. Here, the examples are not construed as limited to the disclosure and should be understood to include all changes, equivalents, and replacements within the idea and the technical scope of the disclosure.

Although terms of "first" or "second" are used to explain various components, the components are not limited to the terms. These terms should be used only to distinguish one component from another component. For example, a first component may be referred to as a second component, and similarly the second component may also be referred to as the first component.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Hereinafter, example embodiments will be described in detail with reference to the accompanying drawings.

FIG. 1 is a diagram illustrating an apparatus for performing a service providing method based on a digital card, according to one embodiment.

A partner terminal 101 may be a terminal for generating a digital code, such as a quick response (QR) code and a barcode, through a digital code management page provided by a server providing server 102. The partner terminal 101 may generate a digital code by connecting a plurality of digital cards to a digital code. A user terminal 103 may be a terminal for selecting a digital card to obtain a permission to enter a predetermined place or access a predetermined area from a plurality of digital cards displayed through a digital code after scanning a digital code displayed on an online area or an offline area.

Referring to FIG. 1, the server providing server 102 may generate a digital code connected to the plurality of digital cards selected by the partner terminal 101. The digital code may be generated in association with a service account of the partner terminal 101. The digital code may be displayed on an online area or an offline area. According to one embodiment, the digital code may be displayed on an application or a webpage online or on outdoor signage, a printed material, or other areas offline.

The partner terminal 101 may generate a service account through the service providing server 102. When the partner terminal 101 logged in with the service account selects an information digital code and information on a plurality of digital cards to be connected to the digital code, the digital code may be connected to the plurality of digital cards and may be generated in association with the service account of the partner terminal 101. In addition, the user terminal 103 may generate a user account through the service providing server 102 or a separate application server (not shown in FIG. 1) linked with the service providing server 102.

The digital code generated by the partner terminal 101 may be generated in association with the service account of the partner terminal 101. In addition, a digital card usable by the user terminal 103 may be linked with a user account of the user terminal 103 and may be managed by the service providing server 102, a storage device of the user terminal 103, or a separate application server linked with the service providing server 102.

As the user terminal 103 determines a digital card connected to a digital code by scanning a digital code displayed on an online area or an offline area, the user terminal 103 may obtain information on a digital card linked with the user account generated through the service providing server 102 or an application server connected to the service providing server 102 among digital cards.

The digital card may include one of an admission ticket, a visit ticket, an identification card, a student card, and an employee card showing a permission or predetermined qualification to access an online area or an offline area determined by the partner terminal 101.

The partner terminal 101 may generate a digital card through a digital code management platform or a digital code management page provided by the service providing server 102 or may load a pre-generated digital card. The digital card may include information on a digital card, such as at least one of a name of the digital card, an image of the digital card, a valid date of the digital card, a distributor of the digital card, and a user who may use the digital card.

The digital code may be connected to the plurality of digital cards. The service providing server 102 may obtain information (e.g., a phone number of the user terminal 103 or a user account) on the user terminal 103 that scans the digital code from the service providing server 102, a separate application server connected to the service providing server 102, or the user terminal 103.

In addition, the service providing server 102 may identify (i) whether a user account of the user terminal 103 that scans a digital code possesses a digital card connected to the digital code, (ii) whether the user account of the user terminal 103 uses the digital code, and (iii) information on a digital card usable by the user account of the user terminal 103 that scans the digital code.

When the user terminal 103 scans digital code, the service providing server 102 may obtain information on a time point when the digital code is scanned and the user terminal 103 that scans the digital code.

Figures 2A, 2B, 2C:
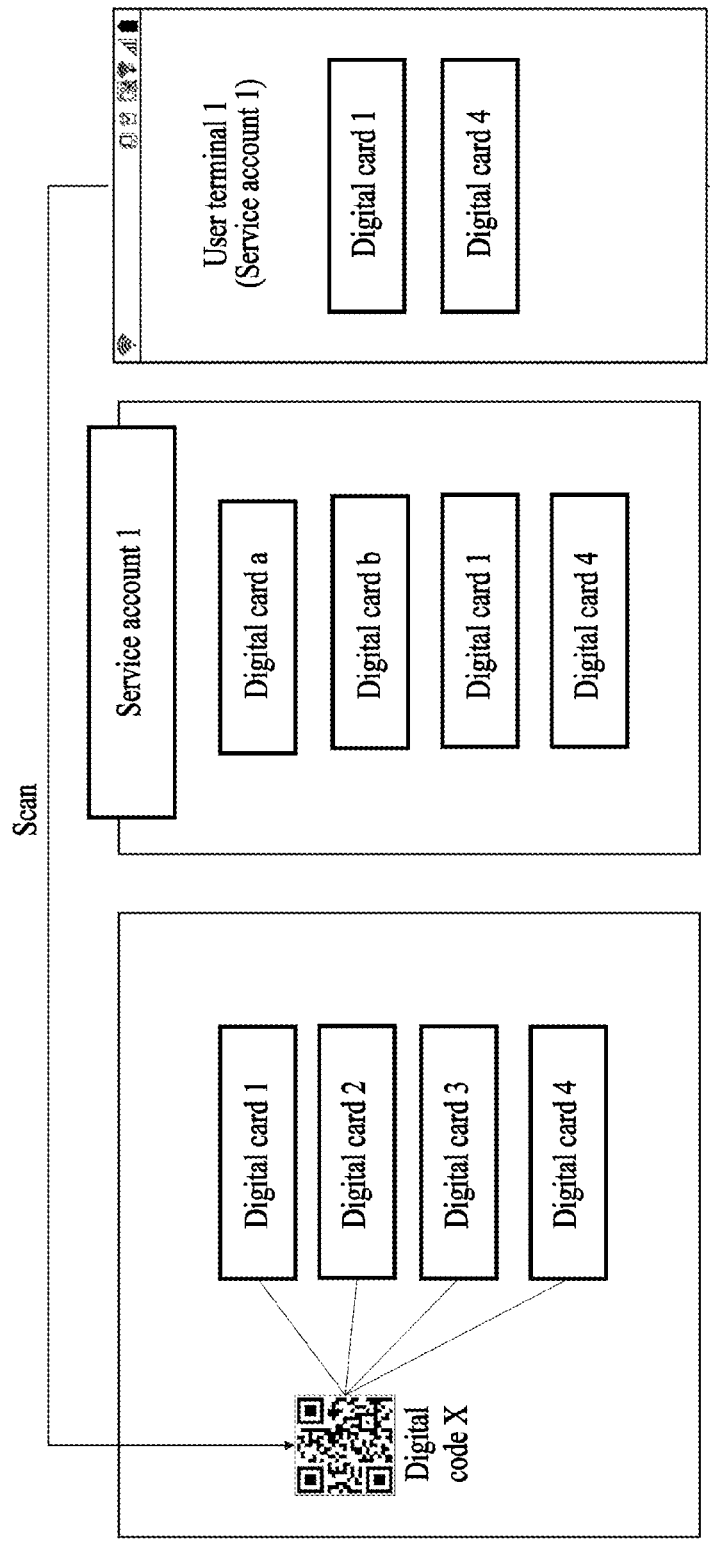
FIGS. 2A to 2C are diagrams illustrating an example of a digital card connected to digital code according to one embodiment.

FIGS. 2A to 2C are diagrams illustrating an example of a digital card connected to a digital code according to one embodiment.

Referring to FIG. 2A, a plurality of digital cards (e.g., a digital card 1, a digital card 2, a digital card 3, and a digital card 4) may be connected to a digital code X. According to one embodiment, when the partner terminal 101 generates or updates a digital code through the service providing server 102, the plurality of digital cards may be connected to the digital code X.

Referring to FIG. 2B, the service providing server 102 may manage a digital card a, a digital card b, a digital card 1, and a digital card 4, which are issued or registered in the user account of the user terminal 1 103. When the user terminal 1 103 scans the digital code X displayed online or offline, the service providing server 102 may identify information on the user terminal 1 103 that scans the digital code X.

The information on the digital card may be stored in the service providing server 102 or the user terminal 103. According to one embodiment, the service providing server 102 may provide, to the user terminal 1 103, information on a digital card associated with the user account of the user terminal 1 103 among digital cards connected to the digital code X. Then, the user terminal 1 103 may display a digital card corresponding to the information on the digital card.

According to one embodiment, when the service providing server 102 provides information on the digital card connected to the digital code X to the user terminal 103, the user terminal 103 may display a plurality of digital cards connected to the digital code X among digital cards stored in the user terminal 103 using the information on the digital card connected to the digital code X, wherein the information is received from the service providing server 102.

Referring to FIG. 2C, the user terminal 1 103 may display a digital card connected to the digital code X on a display among digital cards issued or stored in the user account. In FIG. 2C, the digital card connected to the digital code X among the digital cards issued or stored in the user account of the user terminal 1 103 may be the digital card 1 and the digital card 4.

For example, when the digital card has been already used in the user terminal 1 103 even if the digital card is associated with the user account of the user terminal 1 103 among the digital cards connected to the digital code X, the used digital card may not be displayed on the user terminal 1 103 or may be displayed on the user terminal 1 103 with a guide message of "used" and the date of use.

Figure 3:
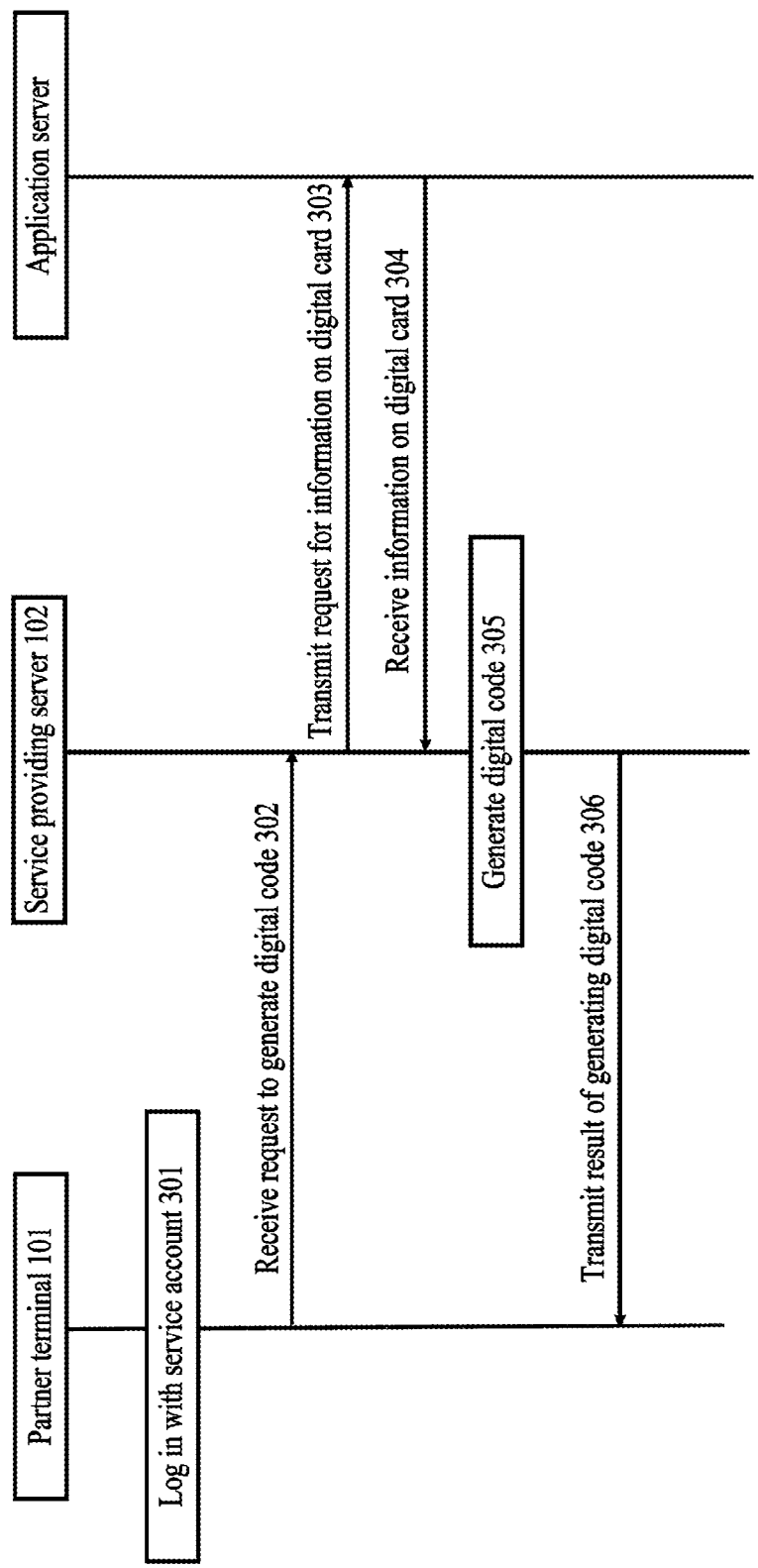
FIG. 3 is a flowchart illustrating a process of generating a digital code connected to a digital card according to one embodiment.

FIG. 3 is a flowchart illustrating a process of generating a digital code connected to a digital card according to one embodiment.

In operation 301, the partner terminal 101 may log in with a service account generated in the service providing server 102.

In operation 302, the service providing server 102 may receive a request to generate a digital code including information input by the partner terminal 101 to generate the digital code through a digital code management page provided by the service providing server 102.

According to one embodiment, information on the plurality digital cards that are able to be connected to the digital code may be stored (i) in the service providing server 102 or (ii) a separate application server linked with the service providing server 102. When the information on the plurality of digital cards that are able to be connected to the digital code is stored in the service providing server 102, operations 303 and 304 may not be performed. In addition, when the information on the plurality of digital cards that are able to be connected to the digital code is stored in the separate application server linked with the service providing server 102, operations 303 and 304 may be performed.

In operation 303, the service providing server 102 may transmit a request for information on a digital card issued to the service account of the partner terminal 101 to the application server linked with the service providing server 102.

In operation 304, the service providing server 102 may receive information on the digital card issued to the service account of the partner terminal 101 from the application server linked with the service providing server 102.

In operation 305, the service providing server 102 may generate a digital code based on the request to generate the digital code, wherein the request is received from the partner terminal 101. In this case, the service providing server 102 may connect digital cards selected by the partner terminal 101 to the digital code. The digital code may be generated in association with the service account of the partner terminal 101

In operation 306, the service providing server 102 may transmit a result of generating the digital code to the partner terminal 101. The result of generating the digital code may include information on a digital code input by the partner terminal 101 and an image of the digital code that may be downloaded by the partner terminal 101. The digital code may be displayed on an online area or an offline area.

Figure 4:
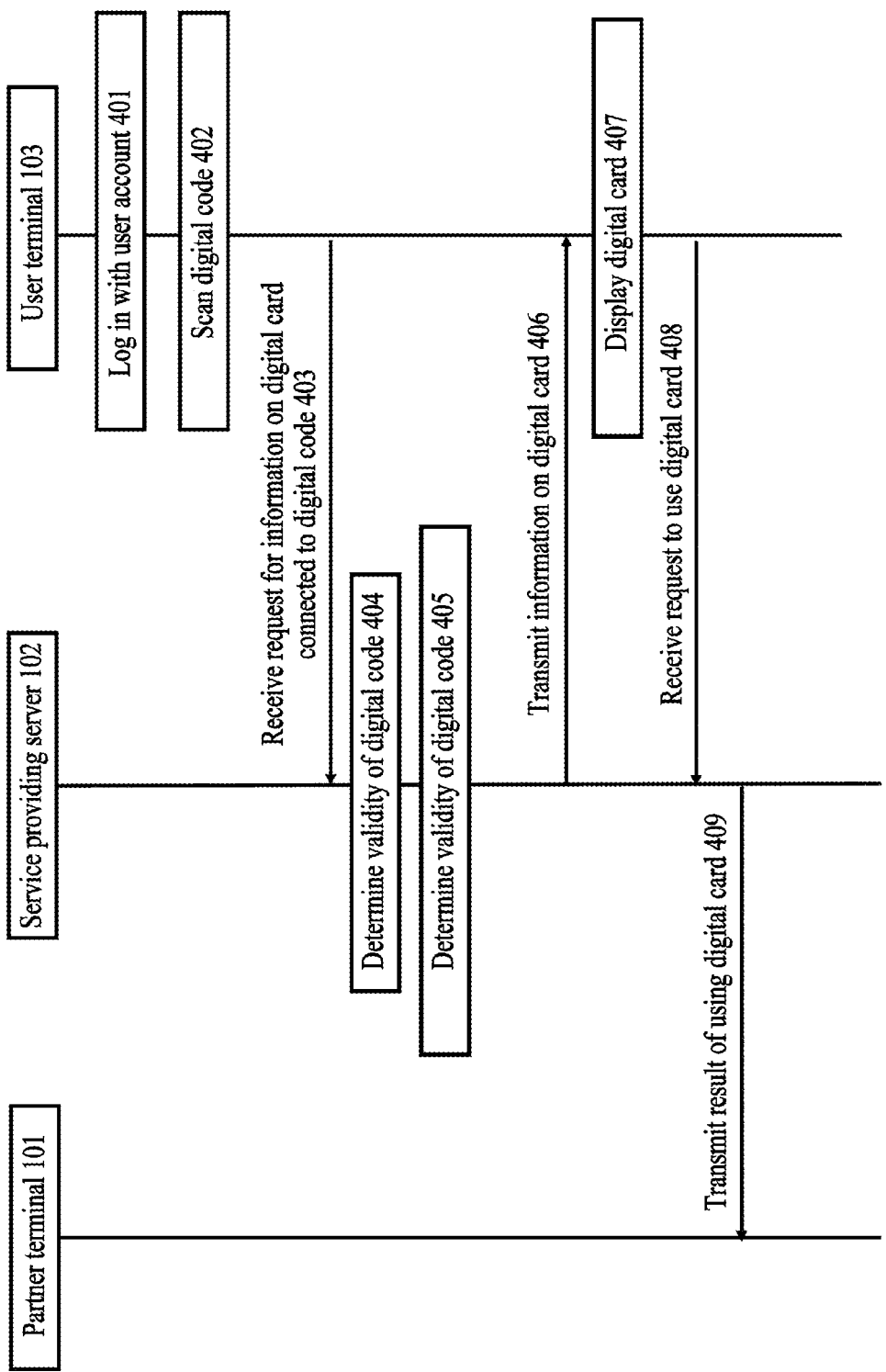
FIG. 4 is a diagram illustrating a process of using a digital card connected to a digital code by scanning the digital code, according to one embodiment.

FIG. 4 is a diagram illustrating a process of using a digital card connected to digital code by scanning the digital code, according to one embodiment.

In operation 401, the user terminal 103 may log in with the user account to a service provided by the service providing server 102 or an application provided by a separate application server linked with the service providing server 102.

In operation 402, the user terminal 103 may scan the digital code displayed on an online area or an offline area.

In operation 403, the service providing server 102 may receive, from the user terminal 103, a request for the information on the digital card connected to the digital code. In this case, the request for the information on the digital card connected to the digital code may include information on the user account of the user terminal 103 or a package ID of the digital card. In this case, the package ID of the digital card may be used as a key for the service providing server 102 to identify information on the plurality of digital cards connected to the digital code 102.

In operation 404, the service providing server 102 may determine validity of the digital code scanned by the user terminal 103. For example, the service providing server 102 may determine validity of the digital code by determining whether information related to the digital code scanned by the user terminal 103 exists or whether a time point in which the user terminal 103 scans the digital code does not pass an expiry date of the digital code set by the partner terminal 101. In the case the expiry date of the digital code is not set when the partner terminal 101 generates the digital code, the digital code may be determined to be valid.

In operation 405, the service providing server 102 may find at least one digital card connected to the digital code scanned by the user terminal 103. For example, the service providing server 102 may extract a digital card associated with the user account of the user terminal 103 from digital cards connected to the digital code when the partner terminal 101 generates the digital code.

In operation 406, the service providing server 102 may transmit information on the digital card.

For example, in case 1, the service providing server 102 may transmit information on all of the plurality of digital cards connected to the digital code to the user terminal 103. In another example, in case 2, the service providing server 102 may compare the plurality of digital cards connected to the digital code to digital cards associated with the user account of the user terminal 103 that scans the digital code and may transmit duplicated information on the digital card to the user terminal 103. In case 2, the service providing server 102 may transmit, to the user terminal 103, information on digital cards associated with the user account of the user terminal 103 that scans the digital code among the plurality of digital cards connected to the digital code.

In operation 407, the user terminal 103 may display a digital card on a display using the information on the digital card received from the service providing server 102. In case 1 of operation 406, the user terminal 103 may identify digital cards associated with the user account among the plurality of digital cards connected to the digital code received from the service providing server 102 and may display the identified digital card on the display. In case 2 of operation 406, the user terminal 103 may display, on the display without modification, a digital card corresponding to the information on the digital card received from the service providing server 102.

In operation 408, the user terminal 103 may transmit a request to use the digital card selected by the user through an interface to the service providing server 102.

In operation 409, the service providing server 102 may provide a result of using the digital card requested by the user terminal 103. For example, the result of using the digital card may include at least one of the number of times the digital cards are scanned, the user account of the user terminal 103, the name of the digital card selected by the user terminal 103, the scanned time of the digital code, or the time of use of the digital card.

FIG. 5 is a diagram illustrating a digital code management page according to one embodiment.

A digital code management page shown in FIG. 5 may be a page for generating a digital code or editing information on the digital code as the partner terminal 101 accesses the digital code management page through the service providing server 102. The digital code management page may provide an interface for the partner terminal 101 to input at least one of the name of the digital code, information of at least one digital card to be connected to the digital code, whether an expiry date of the digital code is set and the expiry date, whether scanning of the digital code is cancelled, content of a scan completion message for the digital code, and content of a duplicated scan message for the digital code to generate the digital code. Some menus displayed on the digital code management page may be hidden in the digital code management page.

When the digital code is generated based on information input by the partner terminal 101 through the digital code management page, the digital code may be generated in association with the service account of the partner terminal 101.

After the digital code is generated, the partner terminal 101 may edit information on the digital code. For this, the digital code management page may be an interface for editing at least one of the name of the digital code associated with the service account of the partner terminal 101, the date of generation of the digital code, the expiry date of the digital code, the service account of the partner terminal 101, the number of completed scans of the digital code, and an image of the digital code.

Figures 6A, 6B, 6C:
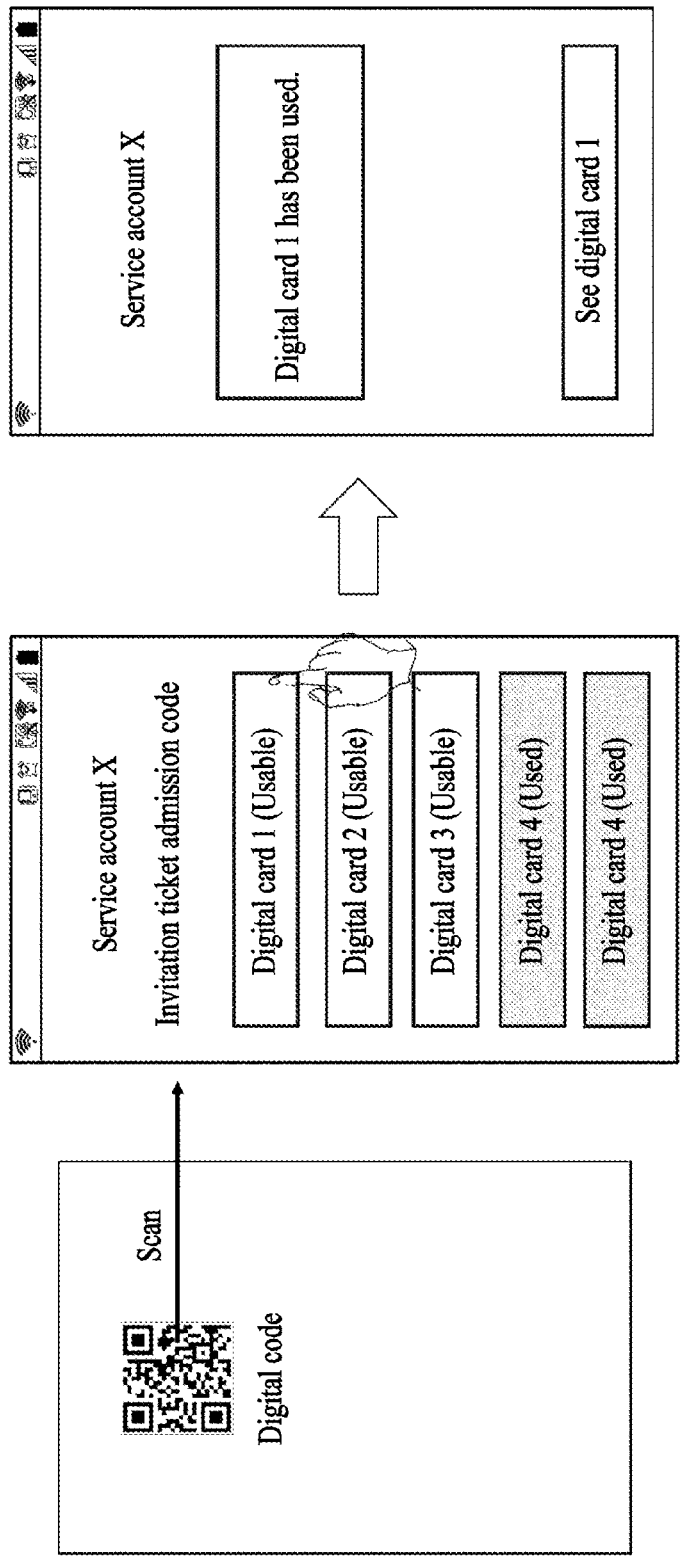
FIGS. 6A to 6C are diagrams illustrating a result of scanning a digital code according to one embodiment.

FIGS. 6A to 6C are diagrams illustrating a result of scanning a digital code according to one embodiment.

In FIG. 6A, illustrated is a digital code displayed on an online area or an offline area. In this case, when the user terminal 103 scans the digital code, at least one digital card connected to the digital code may be displayed on a display of the user terminal 103 as shown in FIG. 6B.

In this case, the digital card displayed on the display of the user terminal 103 may be distinguished as follows.

(1) All digital cards associated with the user account of the user terminal 103 among the plurality of digital cards connected to the digital code (In this case, all of unused digital cards and used digital cards may be displayed on the display. In addition, even if all digital cards are used, the digital cards may be displayed on the display of the user terminal 103. In addition, even if a used digital card is displayed, the digital card may be deactivated such that the digital card may not be selected by the user terminal 103.)

(2) Some of the digital cards associated with the user account of the user terminal 103 among the plurality of digital cards connected to the digital code (In this case, a digital card that is already used may be excluded and only unused digital cards may be displayed on the display.) The user terminal 103 may display usable digital cards by sorting the usable digital cards in the order of latest issuance date. In addition, when the user terminal 103 displays used digital cards, the user terminal 103 may display the used digital cards in the order of latest date of use.

In this case, a user of the user terminal 103 may select a digital card from the digital cards displayed on the display to access an area designated by the partner terminal 101 or use content related to the partner terminal 101. FIG. 6B illustrates a case in which a user selects a digital card 1 from the digital card 1, a digital card 2, and a digital card 3, which are usable.

In addition, when a digital card associated with the user account of the user terminal 103 does not exist among the digital cards connected to the digital code, the user terminal 103 may not display the digital card and may display an invalid page. Alternatively, when all digital cards associated with the user account of the user terminal 103 are used among the digital cards connected to the digital code, the user terminal 103 may not display the digital cards and may display an invalid page.

In addition, when one digital card is associated with the user account of the user terminal 103 among the digital cards connected to the digital code, the user terminal 103 may provide an interface to select the digital card. In addition, even if all digital cards associated with the user account of the user terminal 103 are used among the digital cards connected to the digital code, the user terminal 103 may display the used digital cards.

When the digital card 1 is selected in FIG. 6B, the user terminal 103 may display a message about the use of the digital card 1 as illustrated in FIG. 6C. In addition, the user terminal 103 may display a menu for identifying details (e.g., the name, the time of use, and an image of the digital card 1) of the digital card 1.

Although not illustrated in FIG. 6, when the user terminal 103 scans a duplicated digital code, a message for duplicated scan registered by the partner terminal 101 may be displayed on the user terminal 103. In addition, when the user terminal 103 cancels scan after scanning the digital code, the user terminal 103 may display a message about whether cancellation of scan is available or a message about cancellation of scan is completed.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, for example, a computer program tangibly embodied in a machine readable storage device (a computer-readable medium) to process the operations of a data processing device, for example, a programmable processor, a computer, or a plurality of computers or to control the operations. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A method, performed by a service providing server, of providing a service based on a digital card, the method comprising:
   providing an interface for inputting information to generate a digital code through a digital code management page to a partner terminal;
   receiving a request to generate the digital code including information on the digital code, wherein the information is input by the partner terminal through the interface;
   generating the digital code associated with a service account of the partner terminal in response to the request to generate the digital code; and
   transmitting a result of generating the digital code to the partner terminal,
      wherein the digital code is connected to a plurality of digital cards selected by the partner terminal,
      wherein the digital code management page comprises:
      an interface for the partner terminal to set at least one of:
         whether scan of the digital code is cancelled, or
         content of a message of completion of scan for the digital code, or
         content of a message of duplicated scan for the digital code.

2. The method of claim 1, wherein the digital code management page comprises:
   an interface for the partner terminal to set at least one of:
      a name of the digital code, information on at least one digital card to be connected to the digital code, or
      whether an expiry date of the digital code is set and the expiry date.

3. The method of claim 1, wherein the result of generating the digital code comprises:

information on the digital code input by the partner terminal and an image of the digital code that is downloadable by the partner terminal.

4. The method of claim 1, wherein the digital code management page comprises:
   an interface for the partner terminal to select the plurality of digital cards to connect to the digital code.

5. A method, performed by a service providing server, of providing a service based on a digital card, the method comprising:
   receiving a request for information on a digital card connected to a digital code scanned by a user terminal, wherein the user terminal is configured to log in to a service provided by the service providing server or an application provided by a separate application server linked with the service providing server;
   transmitting the information on a plurality of digital cards connected to the digital code;
   receiving, from the user terminal, a use request to use a selected digital card among the plurality of digital cards connected to the digital code; and
   transmitting a result of using the selected digital card to a partner terminal in response to the use request,
   wherein the transmitting of the information on the plurality of digital cards connected to the digital code to the user terminal comprises:
      transmitting information on the plurality of digital cards connected to the digital code to the user terminal, and
      displaying, on the user terminal, information on a digital card corresponding to a user account of the user terminal among the plurality of digital cards connected to the digital code.

6. The method of claim 5, wherein the transmitting of the information on the plurality of digital cards connected to the digital code to the user terminal comprises:
   transmitting, to the user terminal, information on a digital card corresponding to a user account of the user terminal among the plurality of digital cards connected to the digital code.

7. The method of claim 5, wherein the digital card displayed on the user terminal comprises:
   a digital card that is not used by the user terminal and a digital card that is already used by the user terminal.

8. The method of claim 7, wherein the digital card that is not used by the user terminal is activated to be selected by a user, and
   the digital card that is already used by the user terminal is deactivated to prevent the digital card from being selected by the user.

9. The method of claim 7, wherein the digital card that is not used by the user terminal is displayed by being sorted based on a date of issuance, and
   the digital card that is already used by the user terminal is displayed by being sorted based on a date of use.

10. The method of claim 5, wherein the digital card displayed on the user terminal comprises a digital card that is not used by the user terminal except for a digital card that is already used by the user terminal.

11. The method of claim 5, further comprising:
    when a digital card associated with a user account of the user terminal does not exist among the plurality of digital cards connected to the digital code or all digital cards associated with the user account of the user terminal are used among the plurality of digital cards connected to the digital code, displaying an invalid page on the user terminal.

12. The method of claim 5, wherein the result of using the selected digital card comprises at least one of a number of completed scans of the plurality of digital cards connected to the digital code, the user account of the user terminal, a name of the selected digital card, the time when the digital code is scanned, or the time when the selected digital card is used.

13. A method, performed by a user terminal, of providing a service based on a digital card, the method comprising:
   logging in to a service provided by a service providing server or an application provided by a separate application server linked with the service providing server;
   scanning a digital code displayed on an online area or an offline area;
   transmitting a request for information on a digital card connected to the digital code to the service providing server;
   receiving information on a plurality of digital cards connected to the digital code from the service providing server;
   displaying the digital card based on the received information on the plurality of digital cards; and
   transmitting a request to use the displayed digital card to the service providing server,
   wherein the displaying of the digital card comprises displaying a digital card that is not used by the user terminal and a digital card that is already used by the user terminal.

14. The method of claim 13, wherein the received information on the plurality of digital cards from the service providing server comprises information on a digital card corresponding to a user account of the user terminal among the plurality of digital cards connected to the digital code.

15. The method of claim 13, wherein the received information on the plurality of digital cards from the service providing server comprises information on all of the plurality of digital cards connected to the digital code, and
   the displaying of the digital card comprises displaying a digital card corresponding to a user account of the user terminal among the plurality of digital cards connected to the digital code.

16. The method of claim 13, wherein the digital code is generated in association with a service account of a partner terminal based on information of the digital code input by the partner terminal that logs in with a service account of the service providing server, and
   the digital code is scanned by a user terminal logged in with a user account to a service provided by the service providing server or an application provided by a separate application server linked with the service providing server.

17. The method of claim 13, wherein the digital card that is not used by the user terminal is activated to be selected by a user, and
   the digital card that is already used by the user terminal is deactivated to prevent the digital card from being selected by the user.

18. The method of claim 13, wherein the displaying of the digital card comprises:
   displaying the digital card that is not used by the user terminal based on a date of issuance; and
   displaying the digital card that is already used by the user terminal based on a date of use.

19. The method of claim 13, wherein the displaying of the digital card comprises displaying a digital card associated with a user account of the user terminal among the plurality of digital cards connected to the digital code, and
   the displayed digital card comprises a digital card that is not used by the user terminal except for a digital card that is already used by the user terminal.

* * * * *